(12) United States Patent
Wu et al.

(10) Patent No.: US 12,216,569 B2
(45) Date of Patent: Feb. 4, 2025

(54) SYSTEMS AND METHODS FOR CONFIGURABLE APPLICATION FEATURE EXPERIMENT ALERTING USING SEQUENTIAL TESTING

(71) Applicant: Split Software, Inc., Redwood City, CA (US)

(72) Inventors: Charles Wu, Pittsburgh, PA (US); Gianpiero Condorelli, London (GB); Mansi Mohan, San Francisco, CA (US); Yoneo Arai, San Francisco, CA (US); Gautham Sudarshan, San Mateo, CA (US)

( * ) Notice: Subject to any disclaimer, the term of this patent is extended or adjusted under 35 U.S.C. 154(b) by 109 days.

(21) Appl. No.: 18/123,192

(22) Filed: Mar. 17, 2023

(65) Prior Publication Data

US 2024/0311281 A1 Sep. 19, 2024

(51) Int. Cl.
*G06F 9/44* (2018.01)
*G06F 8/65* (2018.01)

(52) U.S. Cl.
CPC ............ *G06F 11/3688* (2013.01); *G06F 8/65* (2013.01); *G06F 11/3692* (2013.01)

(58) Field of Classification Search
CPC .... G06F 11/3688; G06F 11/3692; G06F 8/70; G06F 11/3684; G06F 11/368; G06F 11/3676; G06F 2201/81; G06F 9/542; G06F 11/3495; G06F 3/048; G06F 11/3672; G06F 2201/865; G06F 6/65
USPC .................................................. 717/124–130
See application file for complete search history.

(56) References Cited

U.S. PATENT DOCUMENTS

| | | | |
|---|---|---|---|
| 2016/0103758 A1* | 4/2016 | Zhao | G06F 11/3684 717/124 |
| 2017/0034023 A1* | 2/2017 | Nickolov | H04L 43/0817 |
| 2017/0168924 A1* | 6/2017 | Dereszynski | H04L 43/50 |

* cited by examiner

*Primary Examiner* — Chuck O Kendall

(57) ABSTRACT

A method and apparatus for configurable application feature experiments is described. The method can include receiving data indicative of a metric to be collected after a feature treatment is deployed to a plurality of configurable applications. The method can also include receiving, from the configurable applications, feature treatment event messages that include metric values associated with the metric. Furthermore, the method can include performing a sequential testing process using the metric values from the event messages to determine when statistical significance has been reached for the metric values satisfying or not satisfying a significance threshold associated with the metric, and using this determination to transmit alerts messages to an application developer system.

20 Claims, 5 Drawing Sheets

SYSTEMS AND METHODS FOR CONFIGURABLE APPLICATION FEATURE EXPERIMENT ALERTING USING SEQUENTIAL TESTING

TECHNICAL FIELD

Embodiments of the invention relate to the field of software application development and deployment, and more particularly, to distributed software feature experimentation.

BACKGROUND

Software applications, such as web page based applications, mobile device applications, desktop computer system applications, etc., are created by software developers. The software applications are then distributed to end users and run on end user computer systems (e.g., run on a user's personal computer, mobile computing device, served to a user from a web server, etc.). From usage of a software application, a developer may determine that changes to the application are necessary and/or desired for various reasons. For example, a software application may contain a bug causing the application to act in undesirable or unforeseen ways, and may even prevent the software application from running. As another example, a developer may want to change a user interface element based on experiences and/or feedback of real world users of the application. As yet another example, a software application update intended to allow a real world user to improve service bookings may actually result in fewer service bookings. As yet another example, a new version of a web page may be intended to decrease page load time, when in fact it increases page load time. Thus, the effectiveness of the application in terms of operational performance and user experience may influence updates to the application.

Software applications, however, are becoming increasingly complex in terms of the number and characteristic of user interface elements, user interface layout, functional elements, options that may be deployed in an application, different deployments to various user groups, as well as other application implementation elements that may impact user experience with an application. Thus, measuring whether an update, potentially containing several new features (e.g., layout changes, feature changes, additional/new elements, etc.) and/or different version deployed to different groups (e.g., a mobile user group, a geographic user group, a specific customer base, etc.), is effective in terms of operational performance and/or application performance metrics is also increasingly difficult. Determining how to test for effectiveness (or lack thereof) of a feature deployment is technically difficulty in terms of when a decision should be made and whether the determination of effectiveness is accurate. Furthermore, is some approaches a window must be established in which testing results are collected, and only at the end of the window can effectiveness be judged. This, however, may delay a decision on application feature effectiveness that over consumes computations and/or network resources. Thus, testing of the deployment of new and/or updated application features is inefficient and often not sufficiently accurate, and more time and computationally efficient approaches the measuring and detecting application features is needed.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
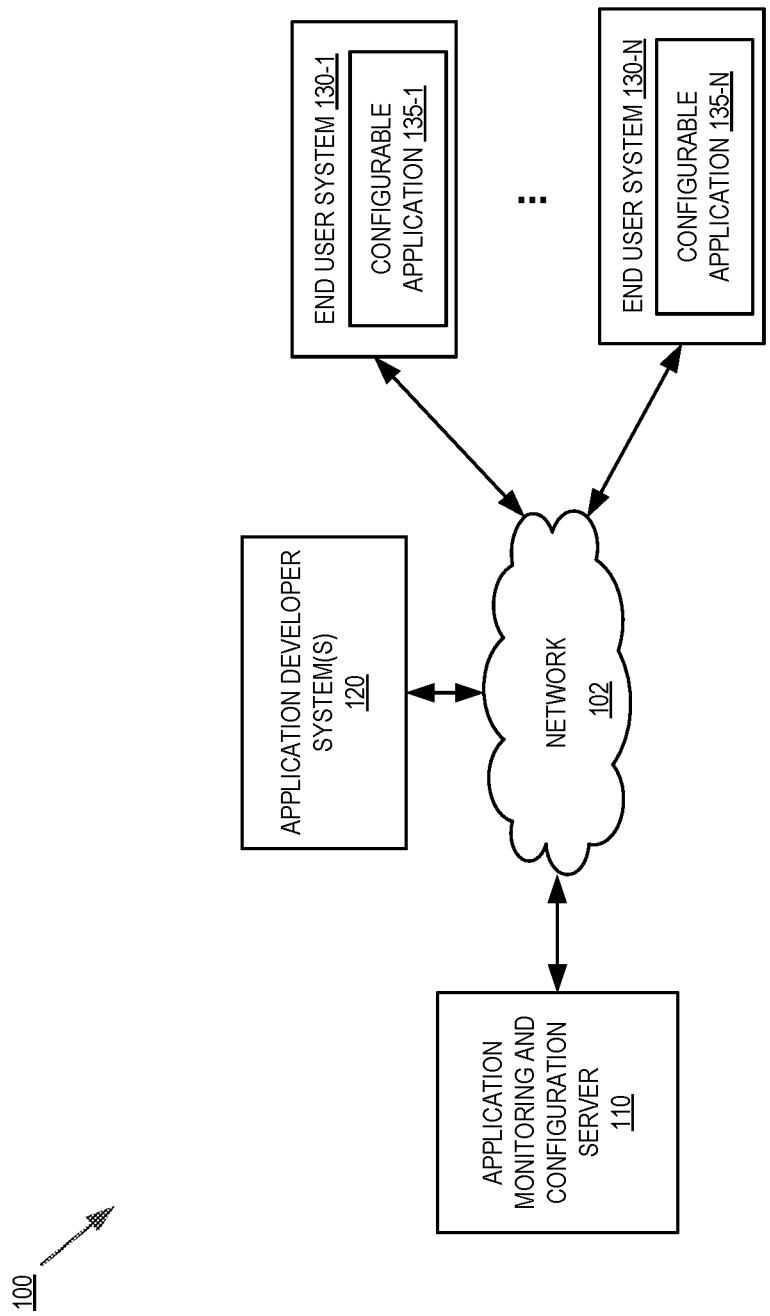
FIG. 1 is a block diagram of an exemplary system architecture for providing sequential testing during configurable application feature experimentation.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "associating", "determining", "performing", "generating", "executing", "adjusting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary system architecture 100 for providing sequential testing during configurable application feature experimentation.

In one embodiment, the system 100 includes a plurality of user systems, such as end user system 130-1 to user system 130-N, application monitoring and configuration server 110, and application developer system(s) 120. In one embodiment, end user system 130-1 to user system 130-N may be personal computing devices, such as a desktop computer, laptop computer, tablet computer, mobile computing device, mobile communication device, wearable devices, gaming devices, medical devices, or other computer systems upon which configurable applications 135-1 to 135-N may be run. The application monitoring and configuration server 110 and application developer system(s) 120 may also be computing devices, such as one or more server computers, desktop computers, etc.

The end user systems 130-1 through 130-N, application monitoring and configuration server 110, and application developer system(s) 120 may be coupled to a network 102 and communicate with one another using any of the standard protocols for the exchange of information. In embodiments, secure protocols for the exchange of information may also be used. In one embodiment, one or more of the end user systems 130-1 through 130-N, application monitoring and configuration server 110, and application developer system(s) 120 may run on one Local Area Network (LAN) and may be incorporated into the same physical or logical system, or different physical or logical systems. Alternatively, the end user systems 130-1 through 130-N, application monitoring and configuration server 110, and application developer system(s) 120 may reside on different LANs, wide area networks, cellular telephone networks, etc. that may be coupled together via the Internet but separated by firewalls, routers, and/or other network devices. In yet another configuration, the application monitoring and configuration server 110 and application developer system(s) 120 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, end user systems 130-1 through 130-N execute applications, such as configurable applications 135-1 through 135-N. The configurable applications may include any type of software application such as an application downloaded to, installed on, and run on a user system, a web based application downloaded from a server computer system and run on a user system, a mobile application where the user system is a mobile device (e.g., tablet computer, laptop computer, mobile telephone, gaming device, medical device, etc.), as well as other types of software applications. Configurable applications 135-1 through 135-N may be configured at run time using application monitoring and configuration server 110 to control how one or more features are treated during execution of the application. For example, a feature may be turned on or turned off by application monitoring and configuration server 110 for execution by one or more user systems 130-1 through 130-N, such as activation of a user interface element, activation of an application capability, etc. As another example, a value may be set by application monitoring and configuration server 110 within an application that impacts how the application is executed by an end user system, such as specifying between different credit cards that can be accepted in a merchant user interface of the application, specifying a user group (e.g. based on device type, demographics, operating system, etc.) to receive a banner ad in a web page, as well as any other type of application configuration. As yet another example, appearance of a user interface may be altered by application monitoring and configuration server 110. In embodiments, the different real-time configurations of running applications are referred to herein as treatments, where a treatment configures one or more application features during the execution of software applications by end user systems. Furthermore, each of user systems 130-1 through 130-N may execute the same or different applications having the same and/or different treatments applied by application execution management server 110. For example, different subsets or populations of end user systems 130-1 through 130-N may have different treatments applied to their respective configurable applications 135-1 through 135-N during treatment efficacy experimentation, as discussed herein. For ease of discussion, and to avoid obscuring embodiments set forth herein, the remaining discussion will assume that the configurable applications 135-1 through 135-N are the same type of application even if they have different treatments being applied.

In one embodiment, configurable applications 135-1 through 135-N are prepared for management by application monitoring and configuration server 110 by a developer of the application, such as by a developer associated with application developer system(s) 120. In one embodiment, a user of application developer system(s) 120 includes a feature treatment logic within each application 135-1 through 135-N. Optionally, a user of application developer system(s) 120 may configure the application to communicate with a software development kit (SDK) (not shown) that is either within each application 135-1 through 135-N or remotely located at, for example, application developer system(s) 120, a web server (not shown) providing the application of developer system, etc. The SDK and documentation for inserting the feature treatment logic within the code of an application may be downloaded from application monitoring and configuration server 110. In embodiments, the SDK is a software development tool responsible for communicating with application monitoring and configuration server 110 on a periodic basis, such using functions and protocols defined by an application programming interface (API) of application monitoring and configuration server 110, for sending and receiving electronic messages over network 102 to enable acquiring definitions that enable the feature treatment logic with applications to select between configurable application features based on, for example, end user system identifiers, user identifiers, or other identifiers, and logic within the application's code for executing a feature specified in the acquired definitions and transmitting reports messages to application monitoring and configuration server 110. Application developer system(s) 120 insert the feature treatment logic into the applications to enable runtime configuration of application features, such as the ability to selectively enable features, selectively change execution of features, selectively turn features on/off, selectively change a user interface and/or the elements contained therein, etc. One embodiment of providing for and configuring the execution of applications with different treatment(s), selectively and in real time using feature treatment logic, is described more fully in U.S. patent application Ser. No. 15/198,498, titled "Systems and Methods for Providing Control of Application Execution", file on Jun. 30, 2016, which is incorporated herein by reference in its entirety.

In embodiments, application developer system(s) 120 may assign application(s) 135 and/or end user systems 130 with unique user identifiers, such as a user key. In embodiments, the user key(s) may be provided to application monitoring and configuration server 110 from application developer system(s) 120, so that application developer system(s) 120 can specify how to identify specific end users and then which end users are to receive which treatments. Furthermore, the user key maintains the privacy of users of the customer, as private and/or personally identifying information is not shared with application monitoring and configuration server 110.

In embodiments, application developer system(s) 120 may provide user attributes that are associated with user keys, for example in a user data store (e.g., user data store 216), such as age, geographic region, gender, income bracket, operating system, device type, etc. This enables application developer system(s) 120 the ability to test software features at end user systems 130-1 through 130-N on a select basis, for example by activating a feature on a specific user (e.g., by user key), a select group of user systems (e.g., subsets or populations of user's having a specific attribute or combination of attributes), to roll out a feature in newly released applications slowly over a set period of time to select user groups and/or users of the same group, to turn off features that are not behaving as expected, etc.

In one embodiment, application developer system(s) 120 further insert event tracking method calls in one or more of configurable applications 135-1 through 135-N. In embodiments, the event tracking method calls may also be inserted into software executing on application developer system(s) 120 and/or external application developer systems (not shown), such as systems providing web based services software, customer resource management software systems, remote data warehouses, enterprise resource planning software systems, active policy management software systems, security information and event management software systems, and/or other software systems used by application developer system(s) 120 that provide software and/or services to end user system(s) 130-1 through 130-N. In embodiments, the method calls are provided by the API distributed by application monitoring and configuration server 110, which may be inserted into and executed by software applications 135-1 through 135-N, as well as applications executed by application developer system(s) 120 and external application developer system(s) 140.

In one embodiment, event tracking method calls, when made, generate a message that includes at least a customer key (e.g., a customer identifier) that enables application monitoring and configuration server 110 to distinguish between different customers (e.g., corporation X and corporation Y), a user key (e.g., a traffic type that identifies one or more users and/or characteristics of users of the customer, such as specific user IDs, class of user, a type of account associated with the user, etc.), an event type that identifies the event being tracked, value(s) associated with one or more metrics for the event (e.g., page load time, time on page, feature exposure, occurrence or non-occurrence of a booking, occurrence or non-occurrence of a sale, number of interactions with a feature, etc., or a combination thereof), a timestamp indicative of when the event triggering the method call occurred, and, in some embodiments, a set of one or more optional properties like user location, gender, demographic information, and any other type of data that can be used to segregate or otherwise differentiate the set of these events at a later time for more fine granular analysis using the techniques discussed herein. For example, the event tracking method call may be triggered in response to a user clicking a buy button on a web based application, a booking is initiated in a mobile app, a user selects a credit card in an application, a user navigates to a specific web page, etc. (e.g., active events with respect to a user interacting with an application), and may also be triggered when a user leaves a specific page of an application or web application, time a frame in an application or web page is displayed, a method call in response to completion of a specific event (e.g., page load time), etc. (e.g., passive events with respect to a user's interactions with an application), where the track method call is included in the code for the application feature being tracked. In embodiments, the method call within the application generates a message including the above described information (e.g., customer key, user key, event type, and value of a metric (if applicable)) and is transmitted to application monitoring and configuration server 110. In one embodiment, the message may be encrypted or otherwise secured to obfuscate the information contained herein. However, as discussed herein, the identifiers do not reveal personal user information, and are instead used by application developer system 120 to associate with the customer's users.

One embodiment of the track events method call, may be a method call, such as track( ) defined in an SDK or API distributed by application monitoring and configuration server 110 and integrated into configurable applications 135-1 through 135-N, which may take four arguments. For example, the track( ) method call may be able to pass to application monitoring and configuration server 110 a customer_ID (e.g., an identifier that represents the customer system, such as an application developer system 120 that distributed configurable applications to end user systems), a traffic_type (e.g., a string that represents an end user system and enables application developer system(s) 120 to identify specific users, groups of users, etc., such as a user ID, account ID, customer type including fee or paid, etc.), an event_type (e.g., a string that represents an event type corresponding to the event that resulted in the track( ) method call), and one or more value(s) (e.g., optional value(s) that may be defined to represent a value or metric to be tracked, which can be set to null or zero in the event application monitoring and configuration server are to count occurrences of an event, and/or which can represent user location, gender, demographic information, and any other type of data used for fine granular analysis of applications). Furthermore, the execution of the track( ) method call may also generate and attach a timestamp to the event message. For example, a track( ) method call may take the form of client.track ("Customer_ID", "Traffic_Type", "Event_Type", Value), with example values of client.track ("john@doe.com", "user", "page_load_time", 83.3334). In embodiments, however, other fields/arguments may be used consistent with the discussion herein for tracking and describing events that occur in response to application of different application treatments.

In embodiments, when event tracking method calls are integrated into features of configurable application(s) 135-1 through 135-N, software running in application developer system(s) 120, and/or software running in external application developer system, application monitoring and configuration server 110 aggregates a plurality of received event messages, and stores the event messages in a data store (e.g., User Data Store 216 illustrated in FIG. 2) by customer key, user key, or any other key, along with the data (e.g. timestamps and other data) from the event messages that enable application monitoring and configuration server 110 to store, locate, and sort event information records. In embodiments, the event messages may be generated from method calls embedded within feature treatments that have been activated in a configurable application. However, event messages may also be generated from method calls in other software components or systems. For example, an event tracking message may be used within a feature's selected treatment to indicate when the user is accessing the treatment or a function within a treatment. As another example, a feature treatment may be designed to improve sales conversions, and the method call is associated with a buy button that is not part of the configurable aspects of the application. As yet another example, an external customer system (not shown), such as a customer relationship management (CRM) system, may use a track event method call when a new contact is added to the CRM system. As yet another example, an event tracking message may be generated automatically upon the occurrence of events by a configurable application, such as automatically generating messages with application metrics for page load time, time on page, error messages, etc., such as by using an agent, function, or other mechanism within the application or webpage based application. As discussed herein, even though one or more of the received event messages are not connected to the execution of the configurable application, they may be relevant to a developer system 120 when determining effectiveness of a treatment with an application. Therefore, the use of the track( ) method calls discussed herein enables the tracking and attribution of events from a more diverse set of systems to improve how relevant events are attributed to feature treatment application at one or more of end user systems 130.

In one embodiment, after aggregating the plurality of events from the various systems from the received event tracking messages, application monitoring and configuration server 110 performs event attribution on the collected corpus of reported events from end user systems(s) 130-1 through 130-N and other software systems that have integrated the tracking techniques discussed herein, where event attribution is described more fully in U.S. patent application Ser. No. 16/681,207, titled "Systems and Methods for Providing Event Attribution in Software Applications", file on Nov. 12, 2019, which is incorporated herein by reference in its entirety. In embodiments, event attribution links events (e.g., from event messages from any source system) with feature treatments applied in a configurable application. The link is established by the application monitoring and configuration server 110 using one or more of the customer key and/or user key, and time stamps in the event messages based on a time when a feature treatment is activated. That is, metric values for specific metrics measured for events (e.g., page load times, clicks, views, buys, feature treatment access, etc.) that occur after a user (e.g., an end user of one of end-user systems 130) received a treatment for a configurable application may be linked/attributed to the feature treatment. Furthermore, because feature treatments may be organized based on any number of end user attributes (e.g., one or more of age, geography, income bracket, user class, gender, profession, etc.), different sample sets or populations may be generated for deploying different feature treatments in different time periods to, for example, roll out features slowly, test feature treatments for specific user groups, etc. The attribution of events to feature treatments, and further based on sample sets, are then used by application monitoring and configuration server 110 to determine, using statistical inference, whether an event was influenced in a causal manner by a feature treatment based on the metric values and event types within the event messages from the different populations/subsets of end users. For example, activating a variant of feature treatment x resulted in a statistically higher sales conversion for users belonging to group y. As another example, activating a variant of feature treatment i resulted in a statistically longer page load time for users belonging to group j. As yet another example, an event triggered on an external system (not shown) is statistically more likely to happen for users in group a exposed to feature treatment m, when compared to users in group b exposed to treatment n.

In one embodiment, statistically significant degradation of a metric attributed to feature treatments and/or statistically significant improvement/degradation of a metric may be used to generate alert messages (e.g., email messages) for the user of application developer system 120. The alert messages, as discussed herein, give early notice to application developer system(s) 120 when a feature treatment is having the opposite of desired impact, or conversely the desired impact, on one or more metrics being measured by the configurable application 130 at end user system(s) 130-1 through 130-N. Furthermore, as discussed herein, the determination of when to generate an alert is based on a statistical analysis determining the statistically significant improvement/degradation using the sequential testing techniques discussed herein. Thus, a user of application developer system(s) 120 is able to determine, through experimentation by deployment of configurable applications, selectively activating feature treatments, and monitoring whether metrics are impacted in statistically meaningful ways by feature treatments, to improve the performance of the configurable applications with respect to the metrics. Additionally, by using the single analysis technique for both determining whether a metric satisfies an alerting condition, and for determining statistical significance of a metric's improvement/degradation improves the efficiency of the alerting by reducing the computational complexity of determining when to generate and whether a statistical significance has been reached.

In embodiments, the alerts, feature treatments, metrics and/or sets of different metrics associated with the statistical analysis may be configured by a user of an application developer system 120. In one embodiment, because events include application developer system 120 defined values and event types, the values and event types are typically associated with key performance measurements of the developer (e.g., sales conversions, service bookings, time on page, page load times, application memory usage, etc.). Therefore, the statistical evaluation of the metric values in the event messages for the relevant event types, and the determination that a feature treatment is determined to have an impact on one or more metrics being tested to a statistical significance, is based on the attribution performed by application monitoring and configuration server 110 to enable application monitoring and configuration server 110 to generate alerts, user interfaces detailing application performance during experimentation (e.g., in response to feature treatments), suggestions to roll back (or kill) a feature deployment transmitted to relevant users of application developer system(s) 120, and/or automatically configure an application's treatment variations with respect to those key performance measurements, such as when it is determined that a metric is statistically likely to have degraded/improved by at least a threshold amount. In one embodiment, alerts may be generated in messages (e.g., email, text, etc.), graphical user interfaces, or a combination when metric degradation is detected by application monitoring and configuration server 110. Beneficially, the notifications, recommendations, and automatic application configuration are based on the specific features and metrics that are relevant to the customer system. In other words, feature level insights are used to determine what is impacting a metric of interest to a developer system 120. Application developer system(s) 120 may use the information to determine which versions (e.g., which treatment or collection of treatments), which specific features, etc. for an update to an application are failing to meet key performance goals at a granular level beyond mere knowledge that an application is not behaving as expected. The application developer system(s) 120 user(s) are then able to more quickly and more accurately address the issues causing unwanted application performance degradation.

In one embodiment, the statistically significant detection of a metric's degradation or improvement for feature treatment improvement/degradation detection may also be used by application monitoring and configuration server 110 to generate notifications and/or actively configure additional end user systems. That is, when application monitoring and configuration server 110 detects that a feature treatment is statistically likely to be causing performance degradation of one or more key metrics by at least a threshold amount (e.g., page load time greater than 10%, page load time greater than 100 ms, page view decrease, sales conversion decease, etc.), in embodiments, application monitoring and configuration server 110 can proactively and automatically without intervention of a user of application developer system(s) 120 apply a baseline feature treatment (e.g., a treatment applied before the degradation, a treatment associated with a control group, a predetermined treatment, etc.) that did not result in degradation of the metric. One or more notifications may accompany this automatic reconfiguration of an application and the detected treatment(s). Similarly, if improvement of those metrics exceeds a threshold, the feature treatment deployment may be increased to additional user(s) and/or groups of user(s). Additionally, external systems may be notified and/or configured based on the detected degradation/improvements, such as issuing commands or request notifications to activate a software development system bug tracking system (e.g., in response to an increase in page load errors), issuing commands or request notification to configure computing resources (e.g., in response to increased or decreased usage, requesting, commanding, or otherwise configuring server systems to appropriately decrease, increase, or other otherwise adjust allocated resources), etc. Therefore, real time testing and analysis enables application monitoring and configuration server 110 to determine in real time when an application feature is degrading key metrics set by a developer system 120, and further how to alert and automatically remedy the degradation with granular feature level insights. Techniques for determining when a feature treatment has a statistically significant impact on a metric is discussed more fully in U.S. Pat. No. 10,936,462, titled "Systems and Methods for Providing Event Attribution in Software Applications", issued on Mar. 2, 2021, which is incorporated herein by reference in its entirety.

Because decisions impacting feature deployment, feature rollout, feature rollback, determination of effectiveness of software application changes, etc. are of great importance to the users of application developer system(s) 120, it is therefore important that those decisions be based on accurate and timely information through improved alerting. In embodiments, application monitoring and configuration server 110 performs sequential testing for experiments involving a feature treatment involving the simultaneous reporting and measurement of one or more metric values (e.g., page load time, memory usage, click through, time on page, sales conversion, etc.). In an embodiment, each metric which is determined to be statistically influenced by the feature treatment is treated as a discovery. That is, when a metric value is determined to have been impacted by a statistically significant amount by a feature treatment, it is considered a discovery of a causal relationship between the metric value and the feature treatment. When each metric value measured in an experiment is analyzed to determine whether there is a statistically significant impact caused by a feature treatment, then in embodiments, a sequential testing procedure is applied to detect, for any metric, whether a feature treatment of an application has a statistically significant impact on that metric. This determination, as discussed herein may then be used to generate one or more alerts (e.g., indicative of a success and/or failure of a feature treatment).

In an embodiment, with sequential testing, metrics are continuously collected after the initiation of an experiment, such as when a new, updated, or changed feature treatment is applied to a user or group of users, and an analysis may then be performed at any point during the experiment. That is, there is no restriction or limitation on a window or number of metrics needed to determine the effectiveness of a feature treatment for a feature. Rather, the sequential testing, which can utilize a Sequential Probability Ratio Test (SPRT), mixture SPRT (mSPRT), confidence sequences, or group sequential methods (e.g., alpha spending/alpha investing methods), etc., may continue to collect sample data (e.g., reported by the configurable applications) and analyze the sample data until: enough testing data has been collected (e.g., metrics collected and attributed to feature treatments) to prove no statistical significance of a treatment on a metric (e.g., the null hypothesis), enough testing data has been collected to prove statistical significance of the treatment on the metric (e.g., the null hypothesis is unlikely, rejected, and the alternative hypothesis is accepted), or further testing data is collected because neither hypothesis can be reached with statistical significance. Thus, sample size and timing windows are not fixed in advance of an experiment enabling alerting to occur sooner, on demand, and/or at any time during the course of an experiment. Furthermore, the sequential testing computations need not be performed after each metric is collected but may be performed periodically as metric values are continuously collected and accumulated during an experiment. However, the sequential testing approach often yields a determination of statistical significance faster than other statistical analysis approaches, and with less required samples, to avoid unnecessary consumption of networking bandwidth (e.g., for reporting during an experiment for which a conclusion has been reached) and unnecessary processing usage (e.g., because computation can be terminated faster than other approaches), which enables the improved alerting sooner than other approaches.

In embodiments, the sequential testing performed by server 110 further results in an always valid p-value approach. The p-value in statistical testing, such as sequential testing, the p-value is the level of marginal significance within a statistical hypothesis test, representing the probability of the occurrence of a given event. The p-value is referred to as always valid because the statistical analysis performed by server 110 (e.g., statistical analysis engine 212 of FIG. 2) can check the statistical results an unlimited number of times to determine when to generate alerts and/or whether statistical significance of a result has been reached, without requiring a correction of a significance threshold, while at the same time minimizing false positive generation. Other approaches to detecting statistical significance may also have a low false positive rate. However, these techniques, such as the Bonferroni correction, might fail to detect statistical significance especially as the number of result checks increases over time. Failure to detect statistical significance can be disastrous for engineers that rely on alerting of feature treatment experiments that seek to discover whether a feature treatment provides a desired result or undesired result (e.g., significant problems and/or benefits from a feature release). Sequential testing, on the other hand, beneficially and flexibly allows an unlimited number of result checks (e.g., statistical significance computations as data samples are accumulated), and has higher statistical power that other approaches (e.g., the Bonferroni approach), when it comes to detecting true signals for detecting statistical significance of a feature treatments improvement/degradation for developer system 120 alerting. Sequential testing thus significantly improves the timing and accuracy of the statistical significance detection used for alerting processes, giving engineers (e.g., users of developer system 120) a better chance to identify and fix any issues with their new features earlier in an experiment, so that new feature deployment and rollout occurs earlier to additional user populations.

Additionally, because testing windows and samples sizes are not fixed, results can be determined and checked at any time using sequential testing, as metrics are monitored throughout the entire experiment and not just within a predefined window, which brings enhanced safety and convenience for users. For example, during early stages of an experiment, on-demand statistical significance checks can be performed by user of developer system 120 to seek early determination of statistical significance of feature treatment improvement/degradation. Furthermore, automated testing may apply a logarithmic fashion of testing frequency that front-loads testing at a higher frequency at an earlier stage of feature treatment experimentation, than later testing, to enable earlier alerting regarding experiment results for feature treatment experimentation. Since the sequential testing technique applied by the application and monitoring configuration server 110 does not result in a decline in accuracy or performance based on the number of testing computations, and corrections to a testing p-value are not required, then any number of hypothesis testing can be computed to earlier detect statistical significance to provide notifications/alerts as to feature treatment experiments. Then, as discussed herein, notification of unsuccessful feature treatment experiments may generated earlier, so that the experiments and/or feature treatment rollout can be stopped sooner preventing degraded features to be exposed to other user systems. Similarly, successful feature treatment experiments that improve configurable application performance may be detected earlier so that notification, alerting, and automatic feature deployment may be rolled out to additional users earlier enabling improved applications to be distributed more efficiently.

In embodiments, detection of significance (or lack thereof) of a configurable feature, application monitoring and configuration server 110 may generate one or more graphical user interfaces (GUI(s)) with the application feature treatment experiment results based on the monitored metric values. The GUI(s) may then be transmitted to application developer system(s) 120 for display of the metrics that have been measured, and the impacts of a feature treatment on those metrics. Furthermore, because experiment results may be obtained at any time, the result may be provided to a developer system 120 on demand, at periodic intervals fixed by the developer, at periodic intervals fixed by the server 110, after a certain number of metric values have been collected, etc. . . . Additionally, in embodiments, the automatic actions, such as automatically rolling back feature deployment, killing a feature having an impact on a metric satisfying an automatic action threshold, etc. may also be based on the sequential testing results to ensure that automated actions may be triggered early and with guarantees of lack of false positives.

Figure 2:
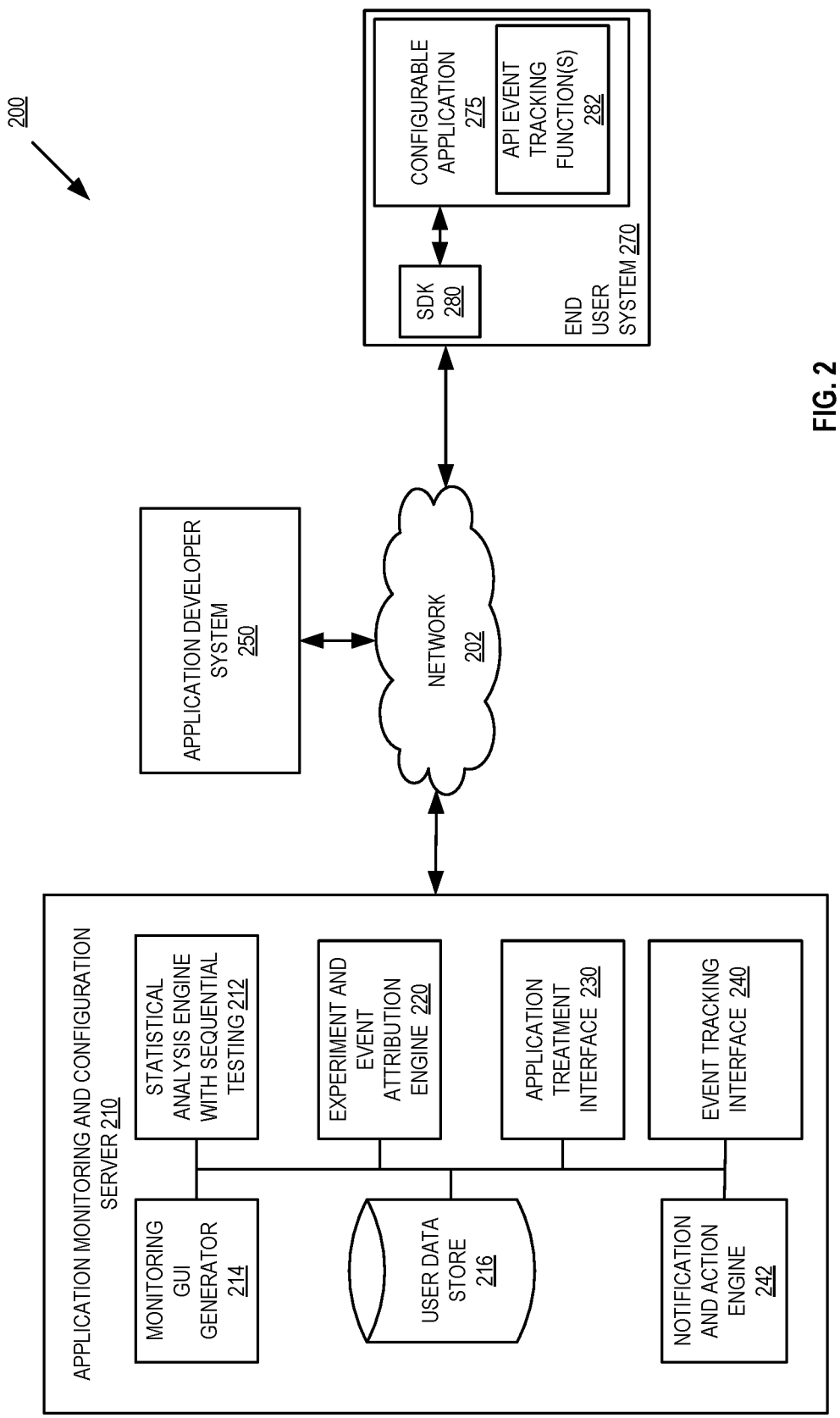
FIG. 2 is a block diagram of one embodiment of an application monitoring and configuration server, an application developer system, and end user systems.

FIG. 2 is a block diagram of one embodiment 200 of an application monitoring and configuration server 210, end user system, and an application developer system 250. The systems illustrated in FIG. 2 provide additional details for the systems discussed above in FIG. 1. Furthermore, although only one application developer system 250 and one end user system 270 are illustrated, any number of such systems may be used for feature treatment experimentation with multiple comparison correction, such as any number of different developer systems and their respective end user systems.

In one embodiment, application monitoring and configuration server 210 includes a statistical analysis engine with sequential testing 212 for performing statistical analysis on metrics collected from events that have been attributed to feature treatments for users/user groups. The determination of statistical significance based on sequential testing does not require correction over time, and may be used to determine both statistical significance of feature treatment experimenting and also for determining alerting/automatic action conditions. In embodiments, as discussed herein, the statistical analysis performed by statistical analysis engine 212 detects statistically relevant movement (e.g., improvement and/or degradation) of metrics associated with feature treatment experimentation, for detecting statistically significant impacts to those metrics caused by features and treatments deployed to configurable application 275 during experiments.

Application monitoring and configuration server 210 further includes graphical user interface (GUI) generator 214 for generating user interfaces for configuring significance threshold value(s) as well as for generating alert user interfaces, user data store 216 for storing events with associated event data and treatments/impressions data, experiment and event attribution engine 220 for attributing event messages from both end user systems and external systems to treatment variations during experiments, application treatment interface 230 for distributing treatment configurations to end user system 270 as specified by application developer system 250 or based on an orchestrated experimentation, event tracking interface 240 to distribute event tracking method call APIs and receive event messages for storage of the event messages and event message data in user data store 216, and notification and action engine 242 for generating notifications and/or automatically re-configuring configurable applications based on that statistical significance analysis results of the statistical analysis engine 212.

End user system 270 includes a configurable application 275 capable of receiving feature treatment configuration data and selectively applying feature treatments, an optional software development kit (SDK) 280 for receiving the feature treatments, and API event tracking functions 280 such as event tracking method calls (discussed above) defined by an API of application monitoring and configuration server 210. In embodiments, the method calls in API event tracking functions 282 may or may not be part of a configurable feature within application, as defined by a developer associated with application developer system 250 includes the method calls within the application.

External application developer systems (not shown), such as a data warehouse, CRM system, policy system, etc., may also include API event tracking functions that a developer has associated with application developer system and has included the method calls for generating event messages within the application being executed at external application developer system Application developer system 250, in embodiments, distributes the configurable application 275 to end user system 270 directly, or through a third party (not shown) such as an application store. Furthermore, after configurable applications are distributed to end user systems, a user of application developer system 250 may define, using application identifiers, customer keys, user keys, etc. which treatments are to be applied to which features in configurable application 275. Furthermore, a user of application developer system 250 may specify an experiment (e.g., define user groups and associated treatments, a timeframe for an experiment including start time and duration, one or more sets of metric values, etc.), and set up an orchestrated experiment (e.g., timed rollout of a feature to members of a user group or user class).

In one embodiment, monitoring GUI generator 214 further generates one or more user interface enabling application developer system 250 to define one or more set(s) of metrics to be monitored during experiments (e.g., feature and/or application rollout to specified users, user groups, etc.), a significance threshold applied to a metric and/or set of metrics, alert policies that define when alerts should be received on features causing metric degradation and/or improvements, suggestions for application configuration (e.g., feature rollback, feature updating to a control group, feature killing, etc.), and definition of when an automatic application configuration may occur. In an embodiment, GUI generator 214 transmits the GUI to a user of application developer system 250. Within the GUI, the user may configure metric(s) to be monitored by statistical analysis engine 212. For example, a user may define tiers of metrics, such as a tier of key metrics of particular interest to the developer, a tier of metrics that are of interest but maybe not as important as the key metrics, as well as any other tiers with a collection of two or more metrics. Furthermore, the developer may define, via the GUI, a significance threshold to be applied to each metric tier and/or metric, which defines an amount or percentage that may be attributable to a falsely attributed result (e.g., a p-value used in null hypothesis testing of a feature treatment impact on a metric). There is a trade-off with respect to this value, such that a significance threshold set too high (e.g., 25%, or a p-value of 0.25) will result in too many falsely attributed statistically significant impacts to metrics by a feature treatment, but statistical analysis will arrive at the determination more efficiently. In contrast, a significance threshold set too low (e.g., 0.5%, or a p value of 0.005) will reduce a likelihood of causing the false attribution noted above, but may take longer to determine statistical significance of results. Thus, in embodiments, the significance level of metric tiers is configurable by a user, and in embodiments, is set to a default of 5% (or a p-value of 0.05). In embodiments, the number of metrics collected, how long an experiment lasts, how many metrics are collected within a single experiment (e.g., 1 metric, 2 metrics, 5 metrics, 10 metrics, and so on), and how many times a statistical significance of the monitored metrics (e.g., measured performance of feature treatments) is calculated, does not impact how the p-value is handled by statistical analysis engine 212. That is, there is not p-value correction over the course of an experiment.

Additional experiment parameters may be configured by the GUI of monitoring GUI generator 214, such as the desired direction of metric (e.g., a page load time should decrease, which indicates to statistical analysis engine 212 that movement of the metric in the opposite direction (e.g. page load time increases) is an undesirable impact on the application), the traffic type to measure (e.g., users, specific user groups, operating systems, device types, etc.), how the metric is measured (e.g., page load times measured in time increments, memory usage measured in byte or megabytes, etc.). Additional configurations, such as configuring the value used in metric measurement may also be specified (e.g., default, a specific value type, a range of values, etc.). As discussed herein, various metrics, metric types, and metric tiers (e.g., event occurrence counts, time on page, page or application error counts, etc., and their grouping into different tiers) may be configured via interfaces generated by monitoring GUI generator 212, similar to the discussion above, and subsequently metrics collected by application monitoring and configuration server.

For a metric being configured, monitoring GUI generator 214 may also generate an alerts policy user interface. The alerts policy interface enables a user of developer system 250 to define how an alerts policy is configured, such as enabling the naming and describing of a policy, enabling the definition of when a statistically relevant degradation of a metric is detected, and who are the user(s) associated with developer system (e.g., developer(s) associated with the configurable application 275, developer(s) associated with a feature associated with the metric, developers that manage the metric, specific user groups, etc.) that should receive notifications in response to the analysis described herein. In an embodiment, an alert policy may be defined for each metric or metric tier configured by a user, by specifying a name of the policy, an optional description of the alert policy, and various alerting conditions. The alerting conditions enable the specification of where an alert should be generated, the alerting threshold being monitored for a metric (e.g., the size of the degradation being monitored, such as for a page load time metric, an alert condition may specify an alert/automatic configuration should be activated when a relative degradation size (e.g., page load time increased by 20%) or absolute degradation (e.g., page load time increased by 100 ms) of the metric value is detected), and the alertees (e.g., metric owners, treatment owners, other users/user groups, additional emails, etc.). Furthermore, additional alert conditions may be specified for the metric, as well as other metrics and/or metric tiers. In one embodiment, not only is degradation of a specific size (e.g. an alerting threshold), but an additional risk tolerance can be established to declare statistical significance (e.g., based on the sequential testing performed by engine 212), where an accepted level of risk of false positives is configured for each alert policy as a 10%, 5%, 1% chance that the detected degradation meeting the threshold amount is incorrectly attributed. This user-defined confidence level may then be compared to the p-value generated by the statistical analysis engine 212 for use during sequential testing to determine if results are statistically significant or not.

In one embodiment, the additional alert condition(s) may include automatic application configuration conditions, which are configurable by a user of a developer system as discussed above by defining a name, description (optional), and the conditions associated with automatic configuration. In embodiments, for example, a larger alert threshold associated with a larger degradation size may be specified for automatic configuration (e.g., alert messages generated at 5% degradation, and feature rollback/killing performed at 20% degradation), a time period upon which an alert message should be handled before feature rollback/killing (e.g., in response to sending alert notification, if not dismissed within 24 hours, rollback/kill the feature), as well as other conditions for automatic application configuration. In embodiments, a combination of different alerting thresholds and confidence levels could be used for alert notifications and automatic application re-configurations. The alert policy(s) may then be created, which are stored by application monitoring and configuration server 210 within user data store 216, and later used by statistical analysis engine 212, as discussed in greater detail below.

In one embodiment, event tracking API manager and interface 240 of application monitoring and configuration server 210 may receive event messages on an ongoing basis, and store the relevant data (e.g., customer key, user key, event type, value, timestamp, etc.) in user data store 216. Then, based on experiment parameters defined by application developer system 250, application treatment interface 230 may distribute feature treatments to associated user(s)/group(s) (e.g., users in a specific region have a specific treatment applied, users of a certain age have a specific treatment applied, users with certain device types may have a specific treatment applied, etc.), and collects event messages. Experiment and event attribution engine 220 then accesses the user data store to obtain event message data associated with the customer key and user key (e.g., event messages associated with application developer system 250, and the end users of that developer including end user system 270).

As discussed below, experiment and event attribution engine 220 may perform event attribution for some events, exclude some users from an experiment, update a version of an experiment, and set a window of time for the experiment (e.g., automatically or based on application developer system input). As discussed herein, application monitoring and configuration server 210 is able to consume event data from any source (e.g., one or more end user systems, external application developer system(s), etc.) so long as the event captured in an event message can be associated with a customer key, traffic/user key, and timestamp. Thus, application monitoring and configuration server 210 allows application developer system(s) and configurable applications to send application monitoring and configuration server 210 data from any source, for automatically identifying the sample population of an experiment, application deployment, etc., and using experiment and event attribution engine 220 to intelligently attribute events to each sample based on targeting rule (e.g., how a user is identified for a treatment) and treatment (e.g., application of the treatment to the identified user).

In embodiments, experiment and event attribution engine 220 combines received event data with the user keys to determine whether the event may have been influenced by a treatment applied to configurable application 275, based on whether the event occurred after the end user system was exposed to the treatment. Furthermore, the event messages, as discussed herein, may include a value associated with an event type that is relevant to the metrics defined by a developer for the event type (e.g., an impact of a particular treatment) compared to a baseline treatment (e.g., values from event messages from another subset of users, for example, those without the treatment applied or a different treatment applied). Experiment and event attribution engine 220 then attributes metrics and associated metric values to feature treatments from the event messages in user data store 216, where event attribution is described more fully in U.S. patent application Ser. No. 16/681,207, titled "Systems and Methods for Providing Event Attribution in Software Applications", file on Nov. 12, 2019, which is incorporated herein by reference in its entirety.

In embodiments, based on the attribution discussed above, experiment and event attribution engine 220 stores the attribution of event messages to treatments, and the metric values reported in those event messages, in user data store 216 for experiments analysis, GUI generation, application rollout, etc. Statistical analysis engine with sequential testing 212 accesses the data store to perform a statistical analysis of the metrics and metric values to detect statistically significant impact on metrics by a threshold amount (e.g., the significance threshold defined by the developer) caused by feature treatment(s) in an experiment In one embodiment, statistical analysis engine 212 correlates the metrics from defined user groups to the treatments they have received via the analysis by event attribution engine 220. For example, statistical analysis engine 212 is able to determine which users received a treatment change (e.g. an experiment population, a rollout population, etc.), and which did not (e.g. control users or control population). Then, statistically consistent sets of users (e.g., groups sharing similar characteristics) may be compared during metric analysis to determine impact of the treatment change, such as users with corresponding demographic information (e.g., age, geography, user device type, operating system, or other demographic information) and which were exposed to treatment variations of a feature for which the metric is being collected. In other words, an apples to apples comparison is being performed by statistical analysis engine 212 to obtain relevant metric value analysis results.

In one embodiment, statistical analysis engine 212 performs a statistical analysis to detect the degradation, improvement, or both of a metric (e.g., page load time) by a certain amount (e.g., the alerting threshold configured by a user system) in a population such that the degradation and/or improvement is statistically likely to have occurred as a result of a feature treatment. For example, the developer defined risk tolerance that a detected statistically significant metric value change is at most 10%, 5%, 1%, etc. likely attributable to an incorrect conclusion. In statistical analysis terms, for the test performed by the statistical analysis engine, a null hypothesis being tested is that the metric is within the threshold set by the developer system, an alternative hypothesis is that the metric exceeds the threshold, and a maximum acceptable error rate is set as the 10%, 5%, 1%, etc. value when disproving the null hypothesis. In embodiments, the test may be performed by the statistical analysis engine 212 in a direction of metric degradation (e.g., as defined by a developer) because degradation generally matters for alerting purposes in one direction (e.g., page load time decreasing is a good result of a feature treatment, and page load time increasing is a negative result of a feature treatment for which alerts and application configuration should be performed to avoid negative end-user experiences). However, in embodiments, the test may also be performed by the statistical analysis engine 212 in a direction of metric improvement, or both improvement and degradation.

In embodiments, the developer system 250 is able to configure the parameters of the test performed by statistical analysis engine 212. That is, the confidence threshold value defined by the customer, in embodiments, is used by the statistical analysis engine 212 to configure the p-value threshold for the test (e.g., developer defined confidence of 95% sets a p-value threshold in the test of 0.05 giving a type one error rate, which is the chance of falsely rejecting the null hypothesis, of 5%). Then, for the test, the statistical analysis engine can set a null hypothesis as impact not satisfying a user defined threshold (e.g., page load time attributed to a treatment variation is the same or less than baseline page load time and/or page load time with an absolute or relative degradation amount equal to the developer defined acceptable threshold), an alternative hypothesis is set as the metric exceeding the threshold defined by a developer and optionally in a defined direction of degradation. Then statistical analysis engine is able to determine when a statistically significant impact on a metric occurs as a result of feature treatment during an experiment, as well as when automatic actions are to be taken, by disproving the null hypothesis with a chance of error no more than the p-value threshold. That is, for a given metric, significance, an alert, and/or an automatic application configuration is performed when statistically significant metric impact is detected, and the impact is statistically unlikely to be incorrectly attributed (e.g., no more than 5% chance that the detected impact is attributable incorrectly to the treatment).

In embodiments, statistical analysis engine 212 executes a statistical analysis engine to compute:

$$p_0 = 1;\ p_n = \min\left\{p_{n-1}, \frac{1}{\Lambda_n^{(H,\theta_0)}}\right\}$$

Where $$\Lambda_n^{(H,\theta_0)} = \sqrt{\frac{2\sigma^2}{2\sigma^2 + n\tau^2}} \exp\left\{\frac{n^2\tau^2(\overline{Y_n} - \overline{X_n} - \theta_0)^2}{4\sigma^2(2\sigma^2 + n\tau^2)}\right\}$$

Here, $\overline{X_n}$ and $\overline{Y_n}$ are means from the control and treatment groups, respectively. $\sigma$ is related to the variance parameter from the statistical $Z_n$, which is assumed to have the distribution $Z_n = Y_n - X_n \sim N(\theta, 2\sigma^2)$, where $X_n$ and $Y_n$ are data collected from the control and treatment groups, respectively.

n is the sample size of the data collected and t is a free-standing hyperparameter that can be tuned. In embodiments, the algorithm from the first equation works as follows: the first analysis starts with a p-value of 1. For each subsequent analysis, the p-value is obtained by taking the minimum of the p-value from the first analysis, and a value calculated from $$\frac{1}{\Lambda_n^{(H,\theta_0)}}.$$

That is, as discussed herein, metric values are measured during an experiment (e.g., for specific feature treatments). In embodiments statistical analysis engine 212 performs sequential testing using formula (1) above. However, statistical analysis engine 212 may alternatively use confidence sequences, or group sequential methods (alpha spending/alpha investing methods) to perform the sequential testing. Regardless of the sequential testing technique used, statistical analysis engine 212 generates a p-value at the point in time at which the statistical analysis engine 212 performs the analysis. This p-value is not subject to correct, nor is it impacted as additional sequential analysis computations are performed, and thus is an always valid p-value. The resulting p-value is then compared by statistical analysis engine 212 to the user specified significance threshold for a metric being tested. When the p-value is smaller than the significance threshold specified by a user, statistical significance is reached and alerting may occur. Statistical analysis engine 212 transmits a statistical significance determination to the notification and action engine 242 including the p-value, an identification of a feature and associated treatment, and data indicative of the accumulated metric values accessed to perform the analysis.

As discussed herein, there is no accuracy degradation based on the number of times statistical analysis engine 212 performs sequential testing. Thus, statistical analysis engine 212, in embodiments, may be configured to determine experiment results using sequential testing on regular periodic intervals until an experiment concludes, on an adjusted periodic basis (e.g., more testing earlier in an experiment than later), based on a number of data samples are received, and/or based on on-demand analysis requests of a user. Such analysis techniques enable statistical analysis engine to detect, earlier and without loss of accuracy, when statistical significance is reached for a feature treatment during an experiment.

Upon detecting satisfaction of an alerting/configuration threshold with a statistically significant likelihood (e.g., based on the sequential testing approach), notification and action engine 242 is informed to generate one or more alerts based on the defined alerting policies. In one embodiment, the alerts may be embodied in test, email, voice, commercial instant messaging system, commercial social network system, or other message(s) generated by monitoring GUI generator 214 that identifies the feature, treatment, threshold, degradation amount, degradation percentage, detection time, likelihood of error etc. Furthermore, the email, instant message, etc. may contain a link to a graphical user interface served by application monitoring and configuration server 210.

Furthermore, the statistical analysis performed by the statistical analysis engine 212 including determinations of statistical significance during an experiment provide alerting notifications to the notification and action engine 242 so that the notification and action engine 242 can rely on the results of statistical engine 212 without having to perform separate calculations (e.g., do not perform a separate calculation of when to perform notification). Thus, upon detecting a metric has changed by an amount that satisfies an alerting/configuration threshold with a statistically significant likelihood by the statistical analysis engine 212, notification and action engine 242 is informed to generate one or more alerts based on the alerting policies. In one embodiment, the alerts may be embodied in test, email, voice, commercial instant messaging system, commercial social network system, or other message(s) generated by monitoring GUI generator 214 that identifies the feature, treatment, threshold, degradation amount, degradation percentage, detection time, likelihood of error etc. Furthermore, the email, instant message, etc. may contain a link to a graphical user interface served by application monitoring and configuration server 210.

Monitoring GUI generator 214 receives the information from the statistical analysis engine 212 and/or notification and action engine 242, and may then present experiment results indicating impacts on metrics, such as indicating metrics that have been significantly impacted by a feature treatment defined for an experiment, how tiers of metrics have been impacted, etc.

In embodiments, the execution and performance by the remote end user systems (e.g., end user system 270) is improved with respect to metric of interest as defined by developer systems 250. More specifically, the sequential testing based statistical analysis performed by application monitoring and configuration server 210 enables a reduction of time and/or sample data size to detection of metric impact satisfying a developer set threshold with a statistical significance that the degradation is not being wrongly attributed to an incorrect determination. This improved efficiency in the determination by the statistical analysis engine 212 suffers not accuracy loss as an experiment runs, and thus accurate experiment results may be provided to users sooner than other approaches, enabling rollout of improved applications sooner to additional users and/or roll back of degraded application sooner with improved efficiency in application bug reporting.

Figure 3:
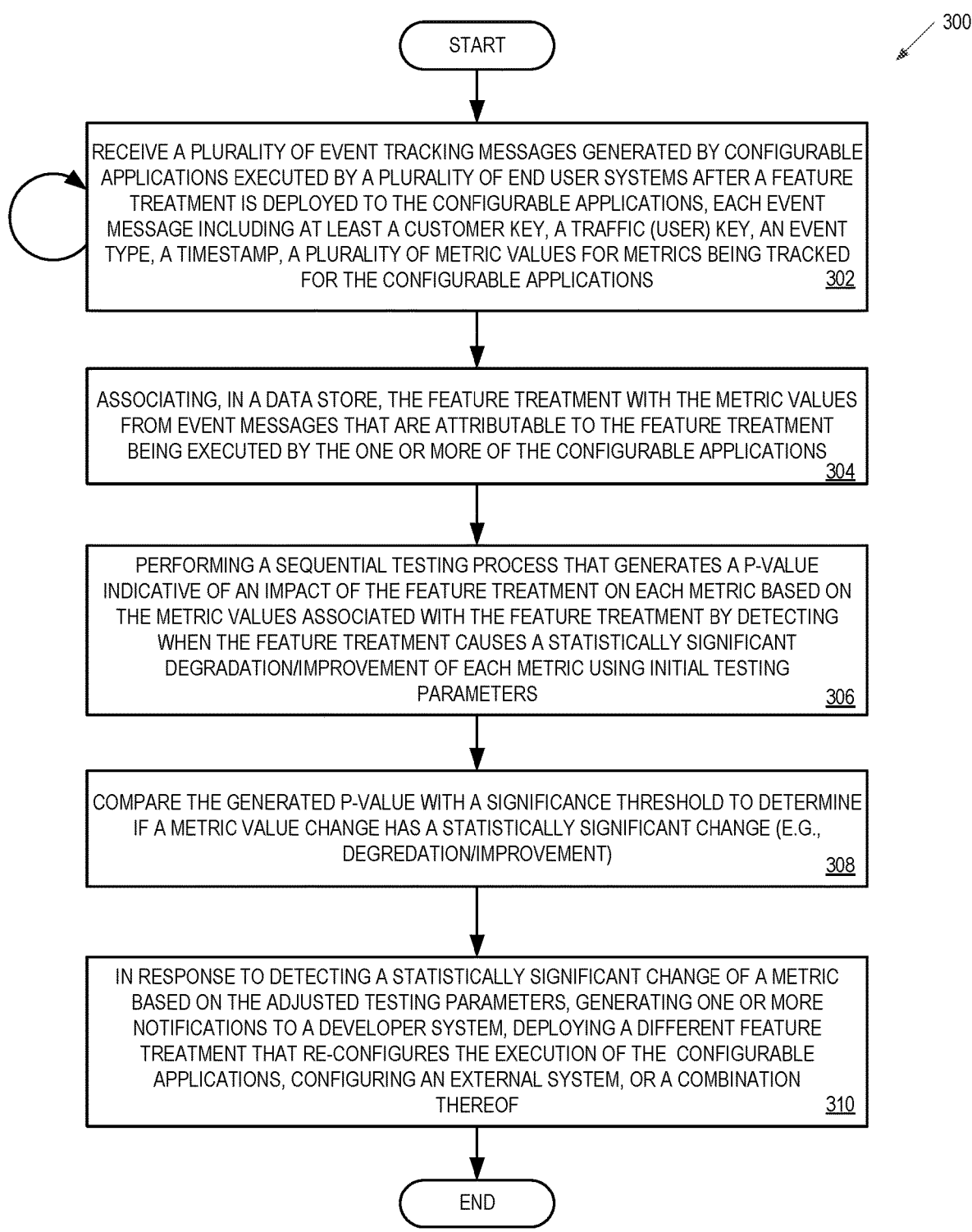
FIG. 3 is a flow diagram of one embodiment of a method for performing sequential testing during configurable application feature experimentation.

FIG. 3 is a flow diagram of one embodiment of a method 300 for performing sequential testing during configurable application feature experimentation. The method 300 is performed by processing logic that may comprise hardware (circuitry, dedicated logic, etc.), software (such as is run on a general purpose computer system or a dedicated machine), firmware, or a combination. In one embodiment, the method 300 is performed by an application monitoring and configuration server (e.g., application monitoring and configuration server 110, 210, or 310).

Referring to FIG. 3, processing logic begins by receiving a plurality of event tracking messages generated by configurable applications executed by a plurality of end user systems after a feature treatment is deployed to the configurable applications, where each event message includes at least a customer key, traffic (user) key, an event type, a timestamp, and a plurality of metric values of metrics being tracked for the configurable applications (processing block 302). In embodiments, the event tracking messages are generated within an application (e.g. API-based messaging, SDK track( ) method calls, etc.), to report metrics and values associated with the tracking. Processing logic continues to receive these reporting messages each time an application is exposed to a feature, uses a feature, etc. as configured by a developer for reporting feature exposure, usage, and/or metrics of interest to the developer. For example, in embodiments, the tracking messages may be placed behind configurable features as well as in other locations in applications, so that tracking messages indicate exposure to such features (e.g. a metric being the number of times an end user is exposed to the feature), a metric value generated for tracking purposes (e.g. a time on page value, a page load time value, click counts, etc.), or a combination of such metrics generated in one or more tracking messages generated from various location(s) in an application.

Processing logic then associates, in a data store, the feature treatment with metric values from event messages that are attributable to the feature treatment being executed by the one or more configurable applications (processing block 304). For example, based on data within the messages, time of message generation, user key, customer key, a time when a configuration, rollout, or experiment occurs, or a combination of such features etc., processing logic attributes an event tracking message, and thus the metric values within the message, to feature treatment variations.

Processing logic then performs a sequential testing process that generates a p-value indicative of an impact of the feature treatment on each metric based on the metric values associated with the feature treatment by detecting when the feature treatment causes a statistically significant degradation/improvement of the metric using initial testing parameters (processing block 306). As discussed above, processing logic performs a statistical analysis of metrics from tracking messages in a population that was exposed to a treatment variation and a statistically consistent population that was not exposed to a treatment variation (e.g., a control group having one or more of the same demographic traits). Then, the metrics reported in the tracking messages are used by a sequential testing process to determine with statistical significance when the metric value(s) associated and attributed to a feature treatment variation are statistically likely to have degraded or improved by a threshold amount as a result of the feature treatment. In embodiments, processing logic analyzes the metric values accumulated during an experiment using formula (1) to generate the p-value, which is a sequential testing technique associated with the mSPRT technique of sequential analysis. However, the confidence sequences, or group sequential methods (alpha spending/alpha investing methods) of sequential analysis may also be used by processing logic.

In embodiments, the statistical analysis is performed using user-defined parameters, configured by a developer of the application for which the analysis is being performed. For example, processing logic may utilize a set of tiers of metrics defined by the developer (e.g., a set of page load time, click count total, average time on page per visit, etc.), optionally a desired impact on the metric such as a desired movement direction (e.g. direction of degradation or direction of improvement indicative of a feature treatment having an unwanted or desired impact on the configurable application), optionally an alerting/action threshold (e.g., an acceptable amount that a metric can move in a direction of degradation or improvement, such as a relative amount or an absolute amount, for example X+10% or X+100 ms respectively before an action is taken), a confidence level (e.g., 90%, 95%, 99%, etc. confidence, or a p-value of 0.1, 0.05, 0.01, etc. that a developer is agreeable to false attribution of metric impact), as well as default values associated with baseline values (e.g. from baseline treatments) or developer defined default values for such metrics.

Processing logic then uses the configurations when performing the sequential testing statistical analysis. For example, a null hypothesis may be set for each metric within the configured threshold value, the alternative hypothesis may be set to the metric value satisfying or exceeding the threshold value in the direction of degradation or improvement (e.g., degradation satisfying the configured threshold or improvement satisfying the configured threshold), and the p-value for the statistical test being 10%, 5%, 1%, etc. corresponding to the user configured confidence level. Processing logic then analyzes the metrics from the attributed events for the different populations to determine when the null hypothesis can be disproved within the configured confidence level based on the performed sequential testing.

As discussed herein, the sequential testing techniques used by processing logic flexibly allows an unlimited number of result checks, which do not impact a p-value generated from the test. That is, adjustments to the p-value generated by the sequential testing in processing block 306 and has higher statistical power when it comes to detecting true signals for the alerting user case. Sequential testing would significantly improve the timing and accuracy of alerts, giving engineers a better chance to fix any issues with their new features in a timely fashion.

Processing logic compares the generated p-value with a significance threshold to determine if a metric value change has statistically significant change (e.g., degradation/improvement) (processing block 308). In embodiments, the user defined significance threshold discussed above is compared to the generated p-value when determining if a statistically significant degradation or improvement of the metric has occurred during an experiment and is attributable to a feature treatment.

Processing logic, in response to detecting the statistically significant degradation or improvement of the metric based on the adjusted testing parameters, generates one or more notifications to a developer system, deploys a different feature treatment that re-configures the execution of the configurable applications, configures an external system, or a combination thereof (processing block 310). The notification(s), in embodiments, and generated and transmitted in response to the value generated during statistical analysis (blocks 306 and 308), and therefore both the notification(s) to alert developer systems and the detection of statistical significance utilize the same values. That is, by utilizing the same value for detecting statistical significance thresholds (e.g., is a result statistically significant) and notification generation/transmission alerting thresholds (e.g., has a value improved or degraded a certain percentage in relation to a metric in which case an alert is to be issued), consistency is maintained between the experiment results detection and notification stages of the feature treatment experimentation discussed herein.

In embodiments, the notification may be an email message, instant message, text message, voice message, or other alert message that includes information about the alert, such as metric to which the alert belongs, degradation amount detected, when the degradation was detected, etc. Furthermore, the alert message may link to a webpage or other user interface to be configured by processing logic. For example, the webpage or other user interface may display relevant information for deciding how to respond to the alert, such as impact on a metric, comparison to a control group, error margin, etc. Additionally, such automatic actions are taken based on statistical analysis using adjusted testing parameters to ensure that such actions are not taken outside of the developer defined confidence threshold.

In embodiments, the sequential testing employed by processing logic, and the resulting p-values generated for the metrics of an experiment, do not degrade over the course of an experiment. Thus, processing blocks 302 through 310 may be repeated any number of times without accuracy loss. Furthermore, because there is not accuracy loss, processing logic does not enforce a monitoring window for the experiment that restricts a number or timing of result checks. Rather, the experiment monitoring window may be arbitrary based on how long a user seeks to run an experiment (e.g., up to a maximum time set by an application monitoring and configuration server 110 or 210), and results may be checked at any time and any number of times, and earlier than other analysis techniques. Thus, sooner notifications may be generated because the sequential testing techniques employed by processing logic generally enable statistical significance detected by processing logic to be detected earlier without risk of increased false positives and/or accuracy degradation as the number of results checks increases. Additionally, the notifications generated by processing logic (e.g., performed by processing logic of a notification and action engine) and the sequential analysis of sample data (e.g., performed by processing logic of a statistical analysis engine) may utilize the same test to determine statistical significance and alerting condition satisfaction. This avoids pitfalls of some systems where discrepant results occur when a user is alerted and when a user checks metric results, as metric results may differ due to further correction from when alerting occurs in these other systems. Sequential testing applied by processing logic, however, uses the same statistical analysis and results to determine experiment results and inform alerting, thus providing each function with the same results.

Figure 4:
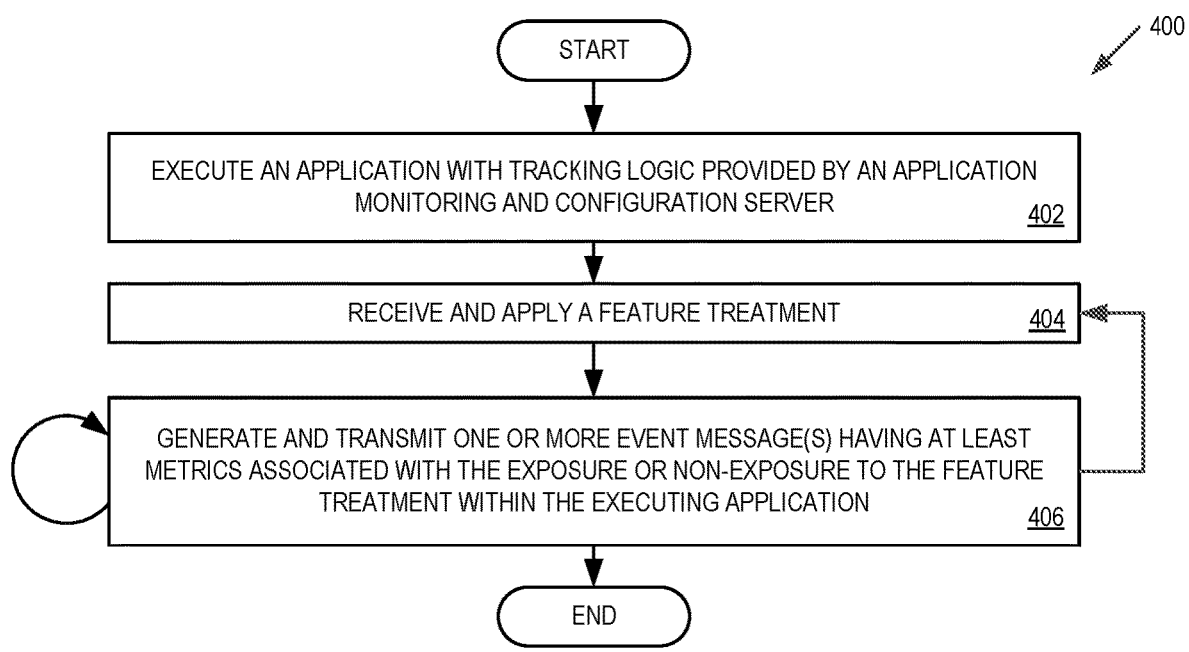
FIG. 4 is a flow diagram of one embodiment of a method for providing event messages from an application to an application monitoring and configuration server.

FIG. 4 is a flow diagram of one embodiment of a method 400 for providing event messages from an application to an application monitoring and configuration server. The method 400 is performed by processing logic that may comprise hardware (circuitry, dedicated logic, etc.), software (such as is run on a general purpose computer system or a dedicated machine), firmware, or a combination. In one embodiment, the method 400 may be performed by a configurable application running on a user system, such as configurable application 135-1 through 135-N and 275.

Referring to FIG. 4, processing logic begins by executing an application with tracking logic provided by an application monitoring and configuration server (processing block 402). For example, application monitoring and configuration server 110 or 210 may provide an API, SDK, etc. to an application developer system (e.g., application developer system 120 or 250), which integrates tracking method calls within relevant portions of one or more software applications to be tracked. For example, the tracking calls may be integrated into application features treatments, where specific treatments are conditionally executed within the configurable application. As another example, tracking calls may be integrated into other software systems, such as membership systems, CRM systems, etc. that are relevant to a feature treatment that is the subject of an experiment. In yet another example, tracking calls may be integrated into several systems, that are part of configurable applications and external systems, where the track calls are integrated into features of relevant that are related to configurable application feature application and application developer system 250 objectives Processing logic receives and applies a feature treatment (processing block 404). For example, processing logic may receive treatments from an application monitoring and configuration server (110 or 210) specifying what feature, treatment values, etc. are to be applied by the application tracking logic.

Processing logic then generates and transmits one or more event messages having at least metrics associated with the exposure or non-exposure to the feature treatment within the executing application (processing block 406). In one embodiment, event messages are generated by executing a tracking method call (e.g. track (customer_ID, traffic_ID, event-ID, metric value, and a timestamp). The date contained within the track( ) call and transmitted by processing logic to application monitoring and configuration server indicates that a feature of interest within an application or external system was accessed by a user of an end user system. Then, when the data, such as customer ID, traffic/ user ID, metric value, event type, timestamps, etc. are attributed to feature deployment and/or rollout based on timing, as discussed above, rich and feature full insights are gained as to whether a treatment applied to a configurable application used by one or more users (e.g., those specified in an experiment rule), and statistical analysis with multiple comparison correction can be performed to determine to a statistical significance when a feature is having a positive and/or negative impact on an application. Then, the application monitoring and configuration server may take appropriate actions, such as generating notifications, automatically configuring an application, or a combination thereof as discussed herein.

Figure 5:
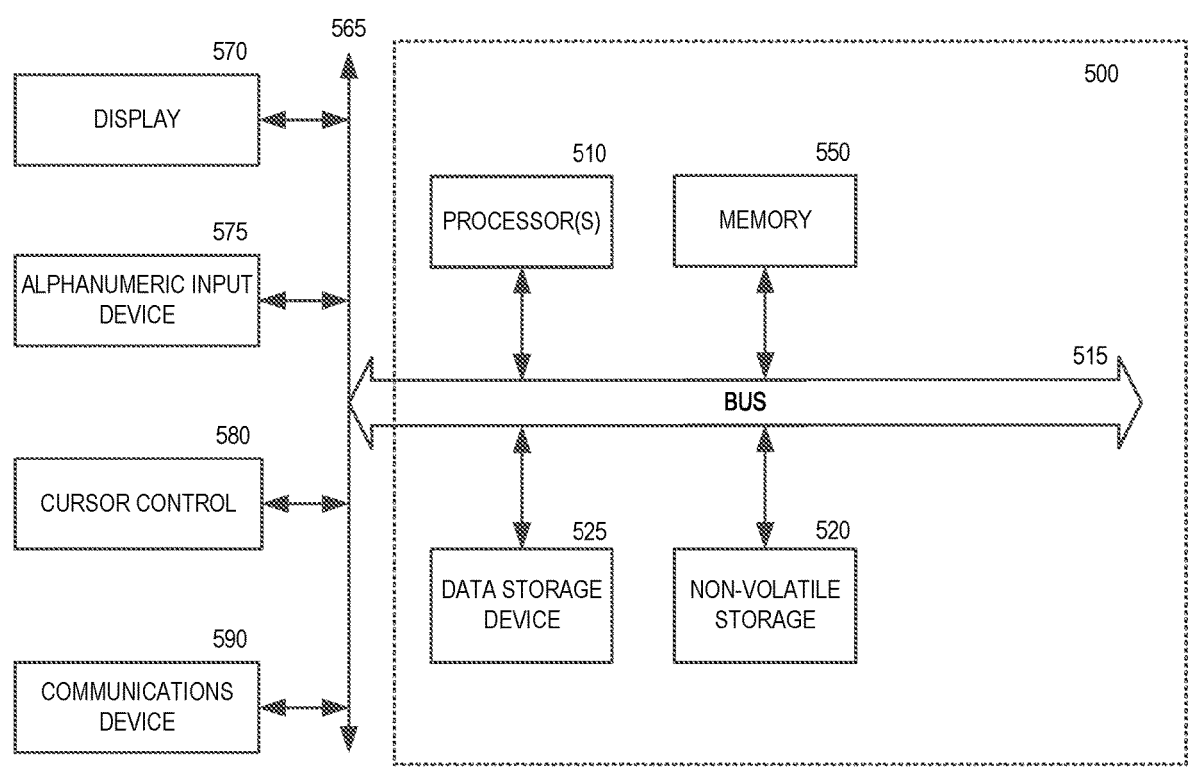
FIG. 5 is one embodiment of a computer system that may be used in accordance with an embodiment of the invention.

FIG. 5 is one embodiment of a computer system that may be used with the present invention, for example, to implement application monitoring and configuration server 110. It will be apparent to those of ordinary skill in the art, however that other alternative systems of various system architectures may also be used.

The data processing system illustrated in FIG. 5 includes a bus or other internal communication means 515 for communicating information, and at least one processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED), a liquid crystal display (LCD), or other display, coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments of the present invention.

It will be appreciated by those of ordinary skill in the art that any configuration of the system may be used for various purposes according to the particular implementation. The control logic or software implementing the present invention can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a non-transitory computer readable medium having computer readable program code embodied therein and being readable by the mass storage device 525 and for causing the processor 510 to operate in accordance with the methods and teachings herein.

The present invention may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method for configurable application feature experiments, comprising:
   receiving, by a computer server from an application developer system, data indicative of: a metric to be collected after a feature treatment is deployed to a plurality of configurable applications executed by a plurality of end user systems, wherein the metric is associated with a performance characteristic of the plurality of configurable applications;

receiving, by the computer server from the configurable applications executed by the plurality of end user systems, feature treatment event messages generated by the configurable applications after deployment of the feature treatment, the event messages comprising metric values associated with the metric;

performing, by the computer server, a sequential testing process using the metric values from the event messages to determine when statistical significance has been reached for the metric values satisfying or not satisfying a significance threshold associated with the metric;

in response to detecting when the statistical significance has been reached based on results of generated by the sequential testing process, generating an alert message indicative of at least the metric, the significance threshold associated with the metric, and the determination of the statistical significance of the metric satisfying or not satisfying the significance threshold; and transmitting, by the computer server to the application developer system, the alert message.

2. The method of claim 1, wherein performing the sequential testing process comprises:

generating, by the computer server, a p-value associated with the significance threshold, wherein the p-value is indicative of whether a null hypothesis of an experiment performed on the plurality of configurable applications is proven, wherein the p-value is generated by the performing of the sequential testing process using the metric values from the feature treatment event messages;

comparing, by the computer server, the p-value to the significance threshold to determine whether the feature treatment caused a statistically significant change in the metric values; and in response to the p-value being less than the significance threshold, determining that the feature treatment has a statistically significant impact on the metric.

3. The method of claim 2, further comprising:

repeatedly performing, by the computer server, the sequential testing process using metric values accumulated over time comprising generating a new p-value each time the sequential testing is performed, wherein each new p-value is indicative of whether the null hypothesis of an experiment performed on the plurality of configurable applications is proven at a time corresponding to the repeated performance of the sequential testing process.

4. The method of claim 3, wherein the repeatedly perform the sequential testing comprises:

adjusting, by the computer server, a rate of the sequential testing over a period of time in which the experiment is performed.

5. The method of claim 4, wherein the rate of sequential testing decreases over the period of time in which the experiment is performed.

6. The method of claim 3, wherein each new p-value is not corrected by the sequential testing process.

7. The method of claim 2, wherein performing the sequential testing process comprises:

receiving, by the computer server from the develop system, a request to perform the sequential testing process;

in response to receipt of the request, performing, by the computer server, an on-demand sequential testing process to determine whether statistical significance has been reached for the metric values satisfying or not satisfying the significance threshold associated with the metric at a time associated with the receipt of the request; and generating, by the computer server in response to the request, an on-demand alert message indicative of statistical significance having been reached or not reached at the time associated with the receipt of the request.

8. The method of claim 2, wherein a period of time in which the experiment is performed is an open period of time.

9. The method of claim 1, further comprising:

receiving, by the computer server from the application developer system, a significance value for detection of feature treatment impact on one or more metrics within the set of metrics; and generating, by the computer server, the significance threshold based on the received significance value.

10. The method of claim 1, further comprising:

generating a graphical user interface for configuration of the metric used for determining when the statistical significance has been reached for the metric values satisfying or not satisfying the significance threshold associated with the metric;

providing the graphical user interface to a user of the application developer system, the application developer system associated with development and distribution of configurable applications to end users of the developer system; and receiving the metric from the developer system via the graphical user interface.

11. The method of claim 1, wherein the alert message comprises an email message, a text message, an instant messaging system message, a social networking system message, a voice message, or a combination thereof, that comprises a link that resolves at a webpage for displaying a notification and data used by the computer server when detecting when the feature treatment caused the statistical significance to be reached.

12. The method of claim 1, further comprising:

automatically deploying a different feature treatment that re-configures the execution of one or more of the plurality of configurable applications based in part of a result of the determination of when statistical significance has been reached for the metric values satisfying or not satisfying the significance threshold associated with the metric.

13. A non-transitory computer readable storage medium including instructions that, when executed by a processor, cause the processor to perform operations for configurable application feature experiments, the operations comprising:

receiving, by a computer server from an application developer system, data indicative of: a metric to be collected after a feature treatment is deployed to a plurality of configurable applications executed by a plurality of end user systems, wherein the metric is associated with a performance characteristic of the plurality of configurable applications;

receiving, by the computer server from the configurable applications executed by the plurality of end user systems, feature treatment event messages generated by the configurable applications after deployment of the feature treatment, the event messages comprising metric values associated with the metric;

performing, by the computer server, a sequential testing process using the metric values from the event messages to determine when statistical significance has been reached for the metric values satisfying or not satisfying a significance threshold associated with the metric;

in response to detecting when the statistical significance has been reached based on results of generated by the sequential testing process, generating an alert message indicative of at least the metric, the significance threshold associated with the metric, and the determination of the statistical significance of the metric satisfying or not satisfying the significance threshold; and transmitting, by the computer server to the application developer system, the alert message.

14. The non-transitory computer readable storage medium of claim 13, wherein performing the sequential testing process comprises:

generating, by the computer server, a p-value associated with the significance threshold, wherein the p-value is indicative of whether a null hypothesis of an experiment performed on the plurality of configurable applications is proven, wherein the p-value is generated by the performing of the sequential testing process using the metric values from the feature treatment event messages;

comparing, by the computer server, the p-value to the significance threshold to determine whether the feature treatment caused a statistically significant change in the metric values; and in response to the p-value being less than the significance threshold, determining that the feature treatment has a statistically significant impact on the metric.

15. The non-transitory computer readable storage medium of claim 14, further comprising:

repeatedly performing, by the computer server, the sequential testing process using metric values accumulated over time comprising generating a new p-value each time the sequential testing is performed, wherein each new p-value is indicative of whether the null hypothesis of an experiment performed on the plurality of configurable applications is proven at a time corresponding to the repeated performance of the sequential testing process.

16. The non-transitory computer readable storage medium of claim 15, wherein the repeatedly perform the sequential testing comprises:

adjusting, by the computer server, a rate of the sequential testing over a period of time in which the experiment is performed.

17. The non-transitory computer readable storage medium of claim 16, wherein the rate of sequential testing decreases over the period of time in which the experiment is performed.

18. The non-transitory computer readable storage medium of claim 15, wherein each new p-value is not corrected by the sequential testing process.

19. The non-transitory computer readable storage medium of claim 14, wherein performing the sequential testing process comprises:

receiving, by the computer server from the develop system, a request to perform the sequential testing process;

in response to receipt of the request, performing, by the computer server, an on-demand sequential testing process to determine whether statistical significance has been reached for the metric values satisfying or not satisfying the significance threshold associated with the metric at a time associated with the receipt of the request; and generating, by the computer server in response to the request, an on-demand alert message indicative of statistical significance having been reached or not reached at the time associated with the receipt of the request.

20. A system for configurable application feature experiments, comprising:

a memory to store feature treatment event messages; and a processing system coupled with the memory configured to:

receive, from an application developer system, data indicative of: a metric to be collected after a feature treatment is deployed to a plurality of configurable applications executed by a plurality of end user systems, wherein the metric is associated with a performance characteristic of the plurality of configurable applications, receive, from the configurable applications executed by the plurality of end user systems, feature treatment event messages generated by the configurable applications after deployment of the feature treatment, the event messages comprising metric values associated with the metric, perform a sequential testing process using the metric values from the event messages to determine when statistical significance has been reached for the metric values satisfying or not satisfying a significance threshold associated with the metric, in response to detecting when the statistical significance has been reached based on results of generated by the sequential testing process, generate an alert message indicative of at least the metric, the significance threshold associated with the metric, and the determination of the statistical significance of the metric satisfying or not satisfying the significance threshold, and transmit, by the computer server to the application developer system, the alert message.

* * * * *